Aug. 4, 1925.
J. A. QUERY
BONBON MAKING MACHINE
Filed Sept. 23, 1922
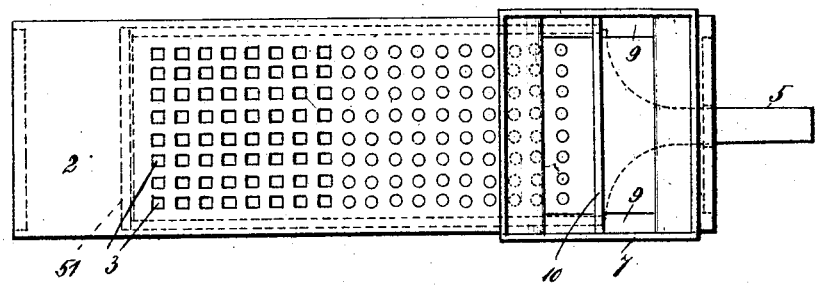
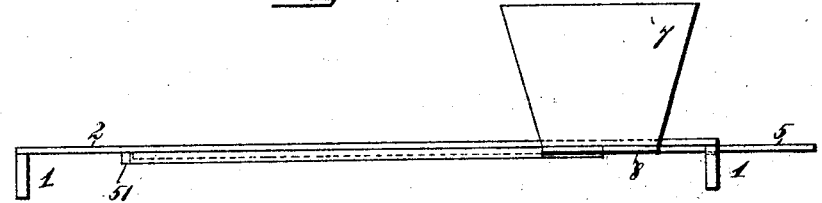
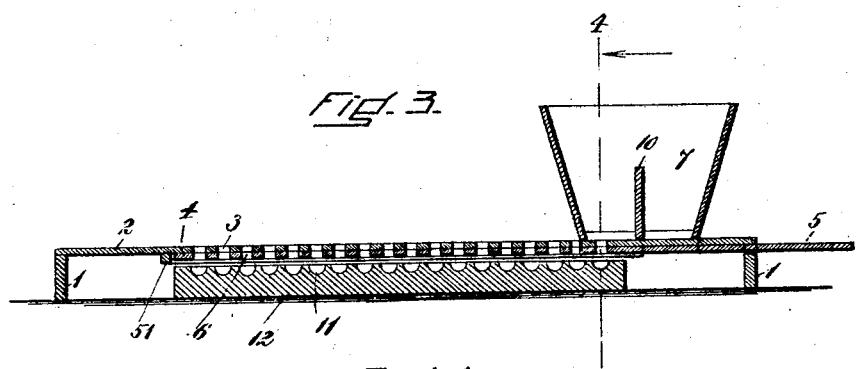
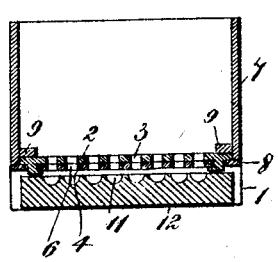

Patented Aug. 4, 1925.

1,548,097

UNITED STATES PATENT OFFICE.

JOSEPH A. QUERY, OF SOMERVILLE, MASSACHUSETTS, ASSIGNOR, BY MESNE ASSIGNMENTS, TO WALTER M. LOWNEY COMPANY, OF BOSTON, MASSACHUSETTS, A CORPORATION OF MASSACHUSETTS.

BONBON-MAKING MACHINE.

Application filed September 23, 1922. Serial No. 590,193.

*To all whom it may concern:*

Be it known that I, JOSEPH A. QUERY, of Somerville, in the county of Middlesex and State of Massachusetts, a citizen of the United States, have invented a new and useful Improvement in Bonbon-Making Machines, of which the following is a specification.

My invention relates to a machine for feeding nuts to cream centres with which they unite, to be afterwards covered with a chocolate coating or otherwise as desired. In making chocolate bonbons containing nuts, the nut meats are placed by hand into starch moulds which are afterwards filled with fondant which unites with the nuts when the fondant has hardened. Thereafter the coating is applied in any convenient way.

The purpose of my invention is to increase the product by feeding the nuts into the cream centre moulds mechanically, and its consists in a machine for this purpose.

My invention will be understood by reference to the drawings, in which—

Figure 1 is a plan view of such a machine;

Fig. 2 being a side elevation;

Fig. 3 a longitudinal section, and

Fig. 4 a section on line 4—4 of Fig. 3.

1, 1 are supports which support a table 2 having openings 3 therein. Mounted in grooves below this table is a slide 4 which has at one end an extension 5 which passes out through a slot in one of the legs and serves as a handle by which the slide may be moved, 51 being a stop to limit its inward movement. The slide 4 also has openings 6 which may register with the openings 3 in the table 2, the movement of the slide being sufficient to bring these openings into or out of register therewith and so open or close the openings 3.

It is of course desirable that the feed may be rendered inoperable at any time. While the openings are shown both square and round, this is merely to indicate that the shape of the openings is immaterial.

7 is a hopper having at its under edge strips 8 and along its interior sides strips 9 which with the strips 8 form a groove so that the hopper 7 may be slid along the full length of the table 2. Within the hopper is preferably a partition 10.

The openings 3 and 6 are spaced apart sufficiently to register with cavities 11 in a starch mould 12 of convenient construction. Starch moulds are usual in the art of casting cream centres.

In using my machine the hopper 7 is filled with nut meats and the starch mould 12 having been put in place so that its cavities 11 may register with the openings 3 in the table, the slide 4 is moved so that there will be a passage from the upper surface of the table 2 through the openings 3 in the table and 6 in the slide. The hopper 7 is then moved along the table at any convenient speed and from it the nut meats drop through the openings into the cavities 11 in the starch moulds.

In practice, this having been accomplished, the starch mould is removed and the fondant or material of which the cream centres are made is poured into the mould in the usual way, the fondant flowing round the nut meats and attaching itself thereto and when the centres are completely hardened the ordinary process of chocolate coating follows.

Above I have described the simplest and most practical form of my invention now known to me, but it will be evident to those skilled in the art that its essentials may be otherwise embodied, its main feature being the perforated table with hopper sliding thereon to distribute the contents of the hopper through the openings in the table.

What I claim as my invention is:—

1. In a machine of the kind described, a perforated table and a perforated slide located with relation to each other whereby the perforations in said table and said slide may be brought into register, a bottomless hopper adapted to be moved over said perforations and distribute its contents therethrough when the perforations in said slide and table are in register, in combination with means to receive said contents.

2. In a machine of the kind described, a table having perforations, a slide located under said table and also having perforations adapted to register with the perforations in the table, and a bottomless hopper adapted to move along said table and distribute its contents through said perforations, said slide being adapted to open or close said perforations at will in combination with a plate located below said table having cavities located to register with said perforations whereby material passing through said perforations may be deposited in said cavities.

3. The distributing mechanism above described comprising a mould having cavities therein, a perforated table located above said mould, the perforations of said table registering with said cavities, and a bottomless hopper mounted on said table to slide thereon having a width substantially the width of said table and a length substantially less than the length of the table whereby the cavities in said mould may be filled progressively as said hopper is slid along the table.

4. The distributing mechanism above described comprising a mould having cavities therein, a perforated table located above said mould, the perforations of said table registering with said cavities, means for opening and closing the passage through said perforations, and a bottomless hopper adapted to slide over said table whereby the contents of said hopper may be deposited in said cavities.

JOSEPH A. QUERY.